Patented Oct. 22, 1940

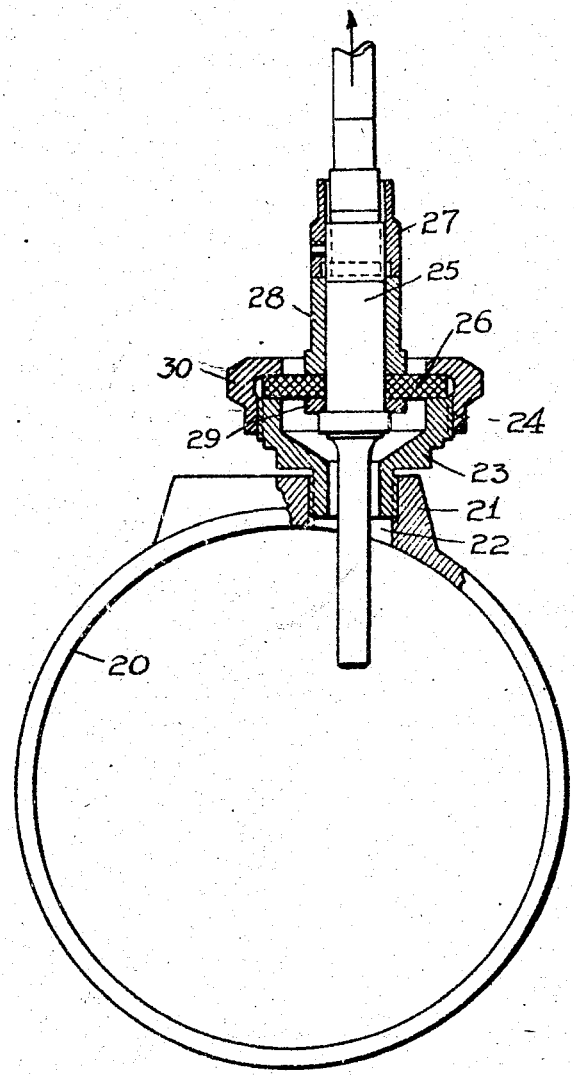

2,218,779

UNITED STATES PATENT OFFICE 2,218,779

SUSPENSION FOR INSTRUMENTS ON TEST STANDS

Friedrich Wendt and Jakob Haug, Berlin, Germany

Application July 9, 1938, Serial No. 218,297
In Germany April 22, 1937

1 Claim. (Cl. 297—3)

This invention relates to the suspension of measuring instruments, e. g. thermometers, especially thermo-elements on machine test stands being exposed to vibrations.

The object of the invention is to prevent the instruments from becoming damaged by carelessness or by strong vibrations when the test stand is in use.

One embodiment of the invention is illustrated by way of example in the accompanying drawing, in which:

The single figure is a longitudinal section of an arrangement according to the invention.

In the figure the pipe conduit 20 is of relatively large diameter and has a connecting socket 21 whose bore 22 is internally screw threaded. An intermediate piece 23 is screwed into the socket 21 and has at its upper end 24 an external screw thread. A rubber washer 26 is stripped on to a thermometer 25 and pressed tightly against a collar 29 on the thermometer by a sleeve nut 27 and spacer sleeve 28. The outer peripheral portion of the rubber washer 26 bears against the upper edge of the intermediate piece 23 and is there held in position by a cap nut 30. By this method of fitting firstly the pipe conduit 20 is absolutely tightly closed at the thermometer socket 21 and secondly the thermometer is elastically suspended on the pipe conduit by means of an axially flexible diaphragm so that it can suffer no harm in the event of vibrations occurring.

Having now particularly described and ascertained the nature of our said invention and in what manner the same is to be performed, we declare that what we claim is:

In combination with a pipe exposed to vibrations on test stands and traversed by a medium of varying temperature, and a temperature responsive instrument projecting freely into said pipe, a tubular bushing mounted directly on and communicating with said pipe, said tubular bushing projecting laterally beyond the periphery of said pipe at a single point only, the outer end of said bushing having an inner diameter considerably in excess of the greatest diameter of said instrument and being provided with an external screw thread, a circumferential flange on said instrument intermediate its ends, said flange having a diameter substantially smaller than the inner diameter of the bushing at its outer end, an annular rubber disc of an inner diameter substantially equal to the inner diameter of said flange and an outer diameter substantially equal to that of the outer end of the bushing, said disc encircling the instrument adjacent said flange, a screw thread on said instrument, a nut of an outer diameter not exceeding that of the flange, said nut engaging said screw thread on the instrument and clamping the inner rim portion of said disc against said flange, the outer rim portion of said disc overlying the outer edge of said bushing, and a cap nut cooperating with the screw thread on said bushing and clamping the outer rim portion of said disc against said outer edge of the bushing, said cap nut having in its cap a central aperture of an inner diameter substantially equal to that of the outer end of the bushing, whereby said rubber disc is secured between said outer end of the bushing and said flange on the instrument as a diaphragm flexible in an axial direction.

FRIEDRICH WENDT.
JAKOB HAUG.